US009979869B2

(12) United States Patent
Park et al.

(10) Patent No.: US 9,979,869 B2
(45) Date of Patent: May 22, 2018

(54) LENS ASSEMBLY AND ELECTRONIC DEVICE INCLUDING THE SAME

(71) Applicant: Samsung Electronics Co., Ltd., Suwon-si, Gyeonggi-do (KR)

(72) Inventors: Chi-Young Park, Gunpo-si (KR); Kwang-Seok Byon, Yongin-si (KR); Jung-Soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/366,413

(22) Filed: Dec. 1, 2016

(65) Prior Publication Data

US 2017/0171440 A1 Jun. 15, 2017

(30) Foreign Application Priority Data

Dec. 14, 2015 (KR) ........................ 10-2015-0178383

(51) Int. Cl.
*H04N 5/228* (2006.01)
*H04N 5/225* (2006.01)
*H04N 5/232* (2006.01)
*G03B 5/00* (2006.01)
*G03B 3/10* (2006.01)

(52) U.S. Cl.
CPC ............ *H04N 5/2254* (2013.01); *G03B 5/00* (2013.01); *H04N 5/2253* (2013.01); *H04N 5/2257* (2013.01); *H04N 5/23258* (2013.01); *H04N 5/23287* (2013.01); *G03B 3/10* (2013.01); *G03B 2205/0007* (2013.01)

(58) Field of Classification Search
CPC ........... H04N 5/23287; H04N 5/23258; H04N 5/2253; H04N 5/2328; G02B 27/646; G03B 2205/0015
See application file for complete search history.

(56) References Cited

U.S. PATENT DOCUMENTS

| 7,693,934 | B2 * | 4/2010 | Jung ................... H04L 12/2805 709/203 |
| 8,244,120 | B2 * | 8/2012 | Chiu ..................... G02B 27/646 348/208.11 |
| 9,544,480 | B2 * | 1/2017 | Katoh ..................... G01C 21/18 |
| 2006/0061660 | A1 * | 3/2006 | Brackmann .......... H04N 5/2253 348/208.1 |

(Continued)

FOREIGN PATENT DOCUMENTS

| JP | 2009-139558 A | 6/2009 |
| JP | 2013-257519 A | 12/2013 |

(Continued)

*Primary Examiner* — Trung Diep
(74) *Attorney, Agent, or Firm* — Jefferson IP Law, LLP

(57) ABSTRACT

A lens assembly and an electronic device are provided. The lens assembly and/or the electronic device includes a lens barrel, a housing configured to accommodate the lens barrel on one surface of the housing, and an image sensor assembly mounted to the other surface of the housing, the image sensor being configured to rotate around an optical axis of the lens barrel. The image sensor assembly includes a ring-shaped rotation member facing the other surface of the housing, and a plurality of balls interposed between the rotation member and the other surface of the housing. The rotation member rotates on a plane perpendicular to the optical axis.

22 Claims, 11 Drawing Sheets

(56) References Cited

U.S. PATENT DOCUMENTS

| | | | |
|---|---|---|---|
| 2009/0160951 A1* | 6/2009 | Anderson | H04N 5/2252 348/208.4 |
| 2011/0007202 A1 | 1/2011 | Chiang | |
| 2014/0362284 A1 | 12/2014 | Shin et al. | |
| 2015/0049209 A1 | 2/2015 | Hwang et al. | |
| 2015/0103195 A1 | 4/2015 | Kwon et al. | |

FOREIGN PATENT DOCUMENTS

| | | |
|---|---|---|
| JP | 2015-132772 A | 7/2015 |
| KR | 10-2010-0103297 A | 9/2010 |
| KR | 10-2015-0020951 A | 2/2015 |

\* cited by examiner

LENS ASSEMBLY AND ELECTRONIC DEVICE INCLUDING THE SAME

CROSS-REFERENCE TO RELATED APPLICATION(S)

This application claims the benefit under 35 U.S.C. § 119(a) of a Korean patent application filed on Dec. 14, 2015 in the Korean Intellectual Property Office and assigned Serial number 10-2015-0178383, the entire disclosure of which is hereby incorporated by reference.

TECHNICAL FIELD

The present disclosure relates to an electronic device. More particularly, the present disclosure relates to a lens assembly that provides a capturing function, and an electronic device including the lens assembly.

BACKGROUND

Along with the development of technology for fabrication of solid-state image sensors, such as a charge-coupled device (CCD) or complementary metal-oxide semiconductor (CMOS) image sensor, electronic devices equipped with a small, lightweight lens assembly, such as mobile communication terminals, have already been commercialized and increasingly encroached on the market of compact digital cameras. As a lens assembly is mounted in a mobile communication terminal usually carried with a user, the user may easily use various functions including video call and augmented reality as well as image or video capturing.

Owing to the proliferation of lens assemblies in electronic devices and the development of optical technology, the lens assemblies may be miniaturized and have improved performance (for example, video quality). To improve the performance of a lens assembly, an automatic focusing function may be used. The automatic focusing function moves an image sensor or a lens positioned ahead of the image sensor along an optical axis according to a distance to an object, and thus enables acquisition of a clear image on an image forming surface of the image sensor.

To improve the performance of a lens assembly, an optical image stabilization (OIS) technique may also be used. According to the OIS technique, shaking of an object image caused by human vibrations such as hand tremors of a user is compensated for. The OIS is possible by detecting vibrations of an electronic device such as a camera through a plurality of angular velocity sensors mounted in the electronic device, and moving a lens or an image sensor according to the angular velocity and direction of the detected vibrations.

The automatic focusing function or the OIS technique may be implemented through linear movement of a lens (and/or a lens barrel) with respect to an image sensor or linear movement of the image sensor with respect to the lens. Even though a structure is installed to increase the performance of the lens assembly, there are limitations in compensating for tremors caused by rotational vibrations of the image sensor with respect to an object. For example, the automatic focusing function or the OIS technique compensates for shaking of an object image with linear movement corresponding to vibrations. However, since curved movement or rotational vibrations may occur during actual capturing, correction of tremors with linear movement has limitations in improving the quality of a captured image.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a lens assembly for compensating for shaking caused by rotational vibrations, and an electronic device including the lens assembly.

Another aspect of the present disclosure is to provide a lens assembly equipped with a technique for compensating for shaking caused by rotational vibrations, which is combined with at least one of an automatic focusing function and an optical image stabilization (OIS) technique, thereby improving the quality of a captured image, and an electronic device including the lens assembly.

In accordance with an aspect of the present disclosure, a lens assembly is provided. The lens assembly includes a lens barrel, a housing for accommodating the lens barrel on one surface of the housing, and an image sensor assembly engaged with another surface of the housing, for rotating around an optical axis of the lens barrel. The image sensor assembly includes a ring-shaped rotation member facing the other surface of the housing, and a plurality of balls interposed between the rotation member and the other surface of the housing. The rotation member rotates on a plane perpendicular to the optical axis.

In accordance with another aspect of the present disclosure, an electronic device is provided. The electronic device includes a lens assembly, an image sensor for detecting image information based on light incident through the lens assembly, and a processor for generating an image based on the image information detected through the image sensor. The lens assembly includes a lens barrel, a housing for accommodating the lens barrel on one surface of the housing, and an image sensor assembly mounted to the other surface of the housing, for rotating on a plane perpendicular to an optical axis of the lens barrel. The image sensor assembly includes a ring-shaped rotation member facing the other surface of the housing, and a plurality of balls interposed between the rotation member and the other surface of the housing. The image sensor is mounted to the rotation member.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
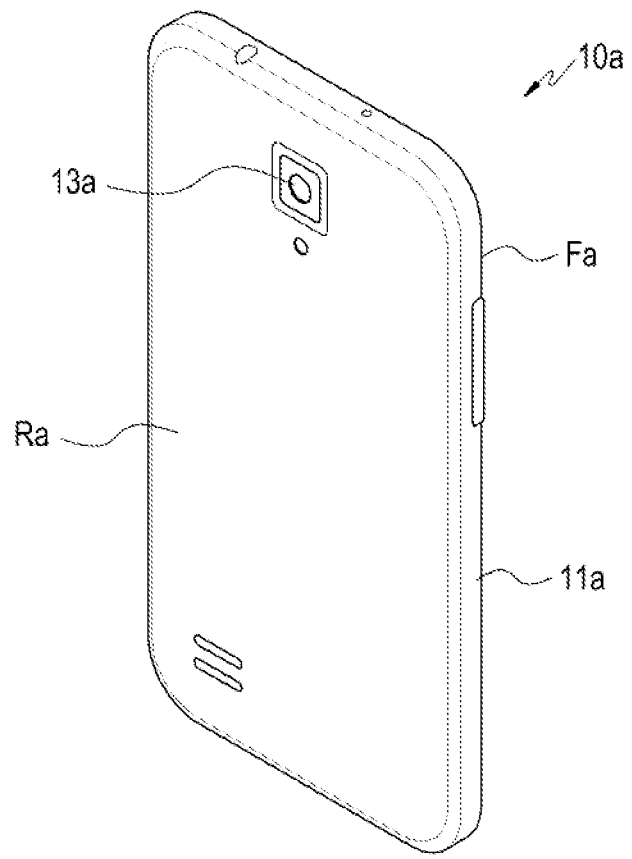
FIG. 1 is a perspective view illustrating an electronic device according to one of various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the term 'have', 'may have', 'include', or 'may include' signifies the presence of a specific feature (for example, number, function, operation, or component such as a part), not excluding the presence or addition of one or more other features.

In the present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, or (3) inclusion of at least one A and at least one B.

The term as used in various embodiments of the present disclosure, 'first' or 'second' may modify the names of various components irrespective of sequence and/or importance, not limiting the components. These expressions may be used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device is 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the corresponding operations by executing one or more software programs stored in a memory.

The terms as used in the present disclosure are provided to describe merely specific embodiments, not intended to limit the scope of other embodiments. It is to be understood that singular forms include plural referents unless the context clearly dictates otherwise. All terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

An electronic device according to various embodiments of the present disclosure may be at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical equipment, a camera, or a wearable device (for example, smart glasses, a head-mounted device (HMD)), electronic clothes, an electronic bracelet, an electronic necklace, an electronic appcessory, an electronic tattoo, a smart mirror, or a smart watch).

According to some embodiments, an electronic device may be a smart home appliance. For example, the smart home appliance may be at least one of, for example, a television (TV), a digital versatile disc (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, Google TV™, or the like), a game console (for example, Xbox™, PlayStation™, or the like), an electronic dictionary, an electronic key, a camcorder, or an electronic picture frame.

According to other embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global positioning system (GPS) receiver, an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler).

According to various embodiments, an electronic device may be at least one of furniture, part of a building/structure, an electronic board, an electronic signature receiving device, a projector, and various measuring devices (for example, water, electricity, gas or electro-magnetic wave measuring devices). According to various embodiments, an electronic device may be one or a combination of two or more of the foregoing devices. According to various embodiments, an electronic device may be a flexible electronic device. In addition, it will be apparent to one having ordinary skill in the art that an electronic device according to an embodiment of the present disclosure is not limited to the foregoing devices and covers a new electronic device produced along with technology development.

FIG. 1 is a perspective view illustrating an electronic device 10a according to one of various embodiments of the present disclosure.

Referring to FIG. 1, the electronic device 10a may include a lens assembly 13a on a rear surface Ra of a casing 10a. An output interface (not shown) including, for example, a display and a receiver, and an input interface (not shown) including, for example, a keypad, may be arranged on a front surface Fa of the casing 11a. According to an embodiment, the display (not shown) may incorporate a touch panel and thus may be used to provide input in the electronic device 10a. The lens assembly 13a may include at least one lens and an image sensor, and have an automatic focusing function, an optical image stabilization (OIS) function, and/or a rotational vibration-incurred shaking correction function.

A user may steer the lens assembly 13a toward an object and capture the object using the electronic device 10a. Even before an image of the object is actually captured, a live view and/or preview function of the electronic device 10a may be activated and thus an image of the object may be displayed on the display.

Figure 2:
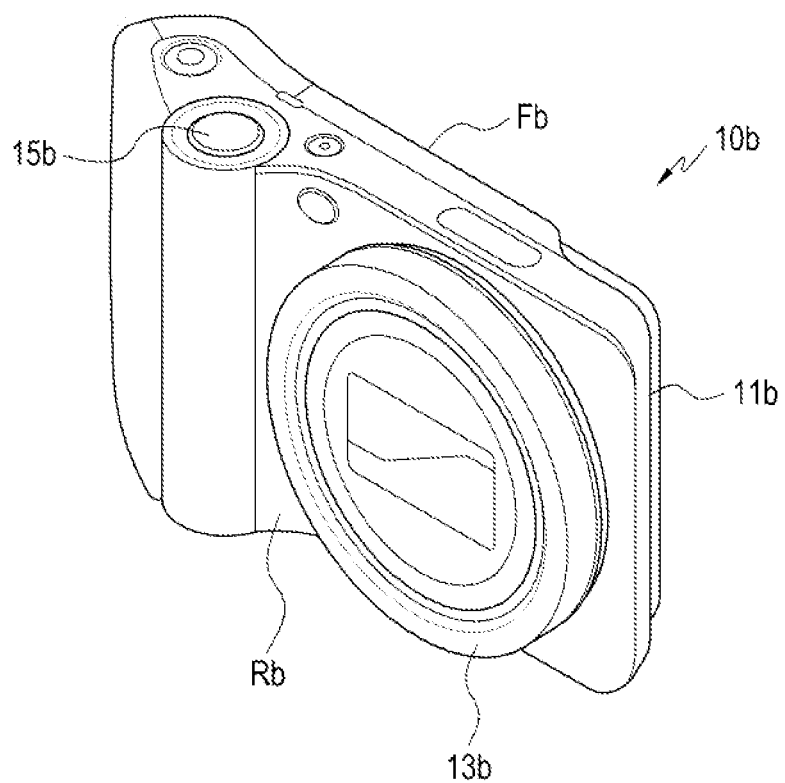
FIG. 2 is a perspective view illustrating an electronic device according to another of the various embodiments of the present disclosure.

FIG. 2 is a perspective view illustrating an electronic device 10b according to another of the various embodiments of the present disclosure.

Referring to FIG. 2, the electronic device 10b may include a lens assembly 13b on a rear surface Rb of a casing 11b. An output interface (not shown) including, for example, a display and a speaker, and an input interface (not shown) including, for example, a keypad), may be arranged on a front surface Fb of the casing 11a. According to an embodiment, the display (not shown) may incorporate a touch panel and thus may be used to provide an input in the electronic device 10b. The lens assembly 13b may include at least one lens and an image sensor, and have an automatic focusing function, an OIS function, and/or a rotational vibration-incurred shaking correction function.

A user may steer the lens assembly 13b toward an object and capture the object using the electronic device 10b. Even before an image of the object is actually captured, a live view and/or preview function of the electronic device 10b may be activated and thus an image of the object may be displayed on the display. According to an embodiment, a shutter switch 15b may be installed on a top surface of the casing 11b, so that the user may start and end capturing the image of the object by manipulating the shutter switch 15b.

Figure 3:
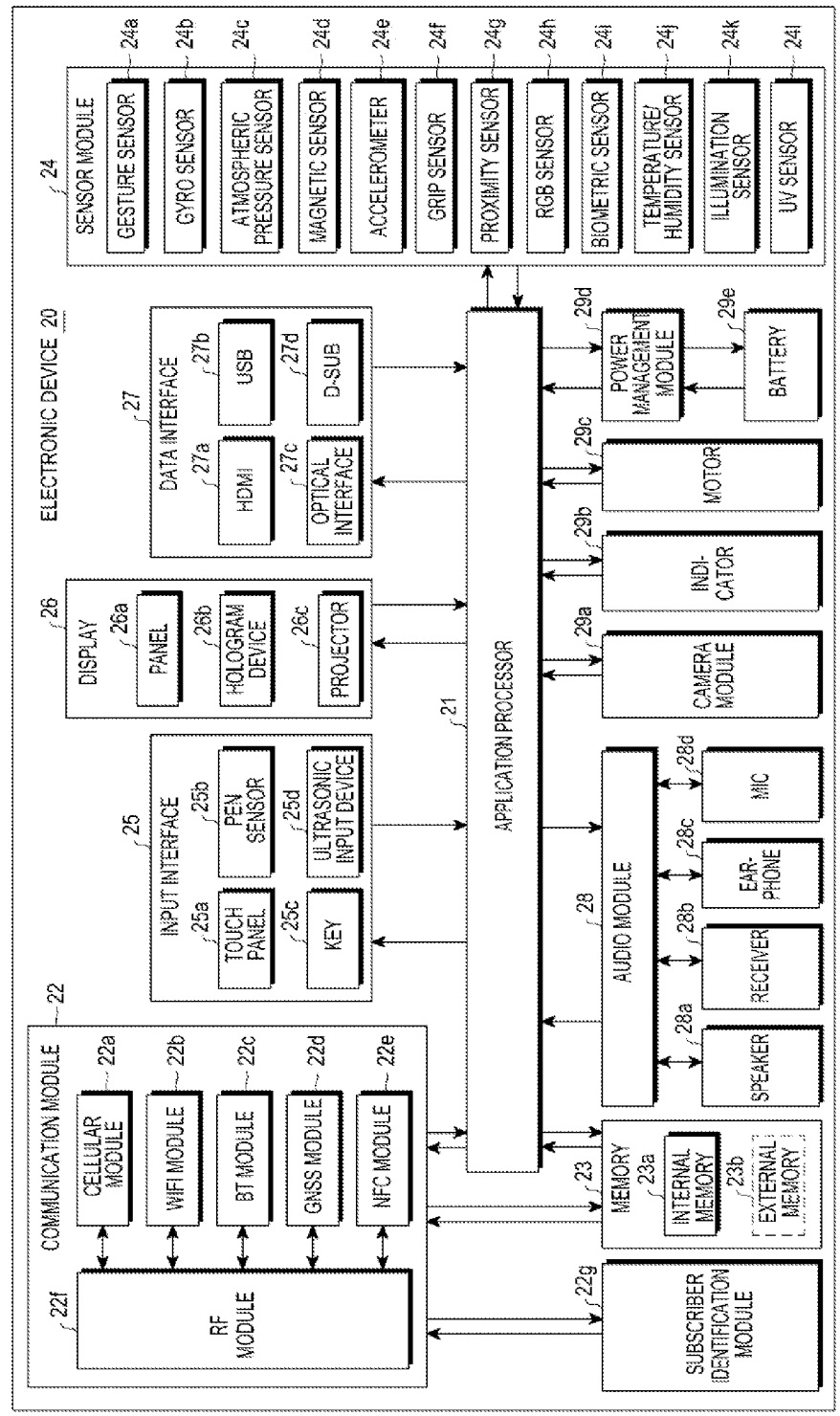
FIG. 3 is a perspective view illustrating an electronic device according to various embodiments of the present disclosure.

FIG. 3 is a block diagram of an electronic device 20 according to various embodiments of the present disclosure.

Referring to FIG. 3, the electronic device 20 may include, for example, the whole or part of the electronic device 10a and/or 10b illustrated in FIG. 1 and/or FIG. 2. The electronic device 20 may include at least one application processor (AP) 21, a communication module 22, a subscriber identification module (SIM, for example, SIM card) 22g, a memory 23, a sensor module 24, an input interface 25, a display 26, data interface 27, an audio module 28, a camera module 29a, an indicator 29b, a motor 29c, a power management module 29d, and a battery 29e.

The AP 21 may, for example, control a plurality of hardware or software components that are connected to the AP 21 by executing an operating system (OS) or an application program and may perform processing or computation on various types of data. The AP 21 may be implemented, for example, as a system on chip (SoC). According to an embodiment, the AP 21 may further include a graphic processing unit (GPU) and/or an image signal processor. The AP 21 may include at least a part (for example, a cellular module 22a) of the components illustrated in FIG. 3. The AP 21 may load a command or data received from at least one other component (for example, a non-volatile memory), process the loaded command or data, and store various types of data in the non-volatile memory.

The communication module 22 may include, for example, a cellular module 22a, a wireless fidelity (WiFi) module 22b, a bluetooth (BT) module 22c, a global navigation satellite system (GNSS) module 22d, a near field communication (NFC) module 22e, and a radio frequency (RF) module 22f.

The cellular module 22a may provide services such as voice call, video call, short message service (SMS), or an Internet service through a communication network. According to an embodiment, the cellular module 22a may identify and authenticate the electronic device 20 within a communication network, using the SIM (for example, SIM card) 22g. According to an embodiment, the cellular module 22a may perform at least a part of the functionalities of the AP 21. According to an embodiment, the cellular module 22a may include a communication processor (CP).

Each of the WiFi module 22b, the BT module 22c, the GNSS module 22d, and the NFC module 22e may include, for example, a processor for processing data transmitted and received by the module. According to an embodiment, at least some (for example, two or more) of the cellular module 22a, the WiFi module 22b, the BT module 22c, the GNSS module 22d, and the NFC module 22e may be included in a single integrated circuit (IC) or IC package.

The RF module 22f may transmit and receive, for example, communication signals (for example, RF signals). The RF module 22f may include, for example, a transceiver, a power amplifier module (PAM), a frequency filter, a low noise amplifier (LNA), an antenna, or the like. According to another embodiment, at least one of the cellular module 22a, the WiFi module 22b, the BT module 22c, the GNSS module 22d, and the NFC module 22e may transmit and receive RF signals via a separate RF module.

The SIM (for example, SIM card) 22g may include, for example, a card and/or an embedded SIM containing subscriber information. The SIM 22g may include a unique identifier (for example, integrated circuit card identifier (ICCID)) or subscriber information (for example, international mobile subscriber identity (IMSI)).

The memory 23 may include, for example, an internal memory 23a or an external memory 23b. The internal memory 23a may be at least one of, for example, a volatile memory (for example, dynamic RAM (DRAM), static RAM (SRAM), or synchronous dynamic RAM (SDRAM)), and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state driver (SSD)).

The external memory 23b may further include, for example, a flash drive such as a compact flash (CF), a secure digital (SD), a micro secure digital (micro-SD), a mini secure digital (mini-SD), an extreme digital (xD), a multimedia card (MMC), or a memory stick. The external memory 23b may be operatively and/or physically coupled to the electronic device 20 via various interfaces.

The sensor module 24 may, for example, measure physical quantities or detect operational states associated with the electronic device 20, and convert the measured or detected information into electric signals. The sensor module 24 may include at least one of, for example, a gesture sensor 24a, a gyro sensor 24b, an atmospheric pressure sensor 24c, a magnetic sensor 24d, an accelerometer 24e, a grip sensor 24f, a proximity sensor 24g, a red, green, blue (RGB) sensor 24h, a biometric sensor 24i, a temperature/humidity sensor 24j, an illumination sensor 24k, and an ultra violet (UV) sensor 24l. Additionally or alternatively, the sensor module 24 may include, for example, an electrical-nose (E-nose) sensor, an electromyography (EMG) sensor, an electroencephaloeram (EEG) sensor, an electrocardiogram (ECG) sensor, an infrared (IR) sensor, an iris sensor, and/or a finger print sensor. The sensor module 24 may further include a control circuit for controlling one or more sensors included therein. According to some embodiments, the electronic device 20 may further include a processor configured to control the sensor module 24, as a part of or separately from the AP 21. Thus, while the AP 21 is in a sleep state, the control circuit may control the sensor module 24.

The input interface 25 may include, for example, a touch panel 25a, a (digital) pen sensor 25b, a key 25c, or an ultrasonic input device 25d. The touch panel 25a may operate in at least one of, for example, capacitive, resistive, IR, and ultrasonic schemes. The touch panel 25a may further include a control circuit. The touch panel 25a may further include a tactile layer to thereby provide haptic feedback to the user.

The (digital) pen sensor 25b may include, for example, a detection sheet which is a part of the touch panel 25a or separately configured from the touch panel. The key 25c may include, for example, a physical button, an optical key, or a keypad. The ultrasonic input device 25d may identify data by detecting, using a microphone (for example, a microphone (MIC) 28d), ultrasonic signals generated from an input tool.

The display 26 may include a panel 26a, a hologram device 26b, or a projector 26c. The panel 26a may be configured to be, for example, flexible, transparent, or wearable. The panel 26a and the touch panel 25a may be implemented as a single module. The hologram device 26b may utilize the interference of light waves to provide a three-dimensional image in empty space. The projector 26c may provide an image by projecting light on a screen. The screen may be positioned, for example, inside or outside the electronic device 20. According to an embodiment, the display 26 may further include a control circuit for controlling the panel 26a, the hologram device 26b, or the projector 26c.

The data interface 27 may include, for example, a high-definition multimedia interface (HDMI) 27a, a universal serial bus (USB) 27b, an optical interface 27c, or a D-sub-miniature (D-sub) 27d. The interface 27 may include, for example, a mobile high-definition link (MHL) interface, an SD/multimedia card (MMC) interface, or an infrared data association (IrDA) interface.

The audio module 28 may convert a sound to an electrical signal, and vice versa. The audio module 28 may process sound information input into, or output from, for example, a speaker 28a, a receiver 28b, an earphone 28c, or the microphone (MIC) 28d.

The camera module 29a may capture, for example, still images and a video. According to an embodiment, the camera module 29a may include one or more image sensors (for example, a front sensor or a rear sensor), a lens, an image signal processor (ISP), or a flash (for example, a light emitting diode (LED) or a xenon lamp). In another embodiment, the camera module 29a may include the lens assemble 13a and/or 13b illustrated in FIG. 1 and/or FIG. 2 and/or a later-described image sensor 233 illustrated in FIG. 5.

The power management module 29d may manage, for example, power of the electronic device 20. According to an embodiment, the power management module 29d may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may use additional circuits for wireless charging, such as a coil loop, a resonance circuit, or a rectifier. The battery gauge may measure, for example, a charge level, a voltage while charging, current, or temperature of the battery 29e. The battery 29e may include, for example, a rechargeable battery and/or a solar battery.

The indicator 29b may indicate specific states of the electronic device 20 or a part of the electronic device 20 (for example, the AP 21), for example, boot status, message status, or charge status. The motor 29c may convert an electrical signal into a mechanical vibration and generate vibrations or a haptic effect. While not shown, the electronic device 20 may include a processing device for supporting mobile TV (for example, a GPU). The processing device for supporting mobile TV may process media data compliant with, for example, digital multimedia broadcasting (DMB), digital video broadcasting (DVB), or MediaFLO.

Each of the above-described components of the electronic device may include one or more parts and the name of the component may vary with the type of the electronic device. According to various embodiments, the electronic device may be configured to include at least one of the afore-described components. Some component may be omitted from or added to the electronic device. According to various embodiments, one entity may be configured by combining a part of the components of the electronic device, to thereby perform the same functions of the components prior to the combining.

The term "module" as used herein may refer to a unit including one or a combination of two or more of hardware, software, and firmware. The term "module" may be used interchangeably with terms such as, for example, unit, logic, logical block, component or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific integrated circuit (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium, in the form of a programming module. When the commands are executed by a processor (for example, the AP 21), one or more processors may execute functions corresponding to the commands. The computer-readable storage medium may be, for example, the memory 23.

The computer-readable medium may include hard disk, floppy disk, magnetic media (for example, magnetic tape), optical media (for example, compact disc read-only memory (CD-ROM)), DVD, magneto-optical media (for example, floptical disk), hardware devices (for example, read-only memory (ROM), random access memory (RAM) or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added.

The various embodiments disclosed in the present specification are provided for description and understanding of the present disclosure, not limiting the scope of the present disclosure. Accordingly, the scope of the present disclosure should be interpreted as embracing all modifications or various embodiments within the scope of the present disclosure therein.

Figure 4:
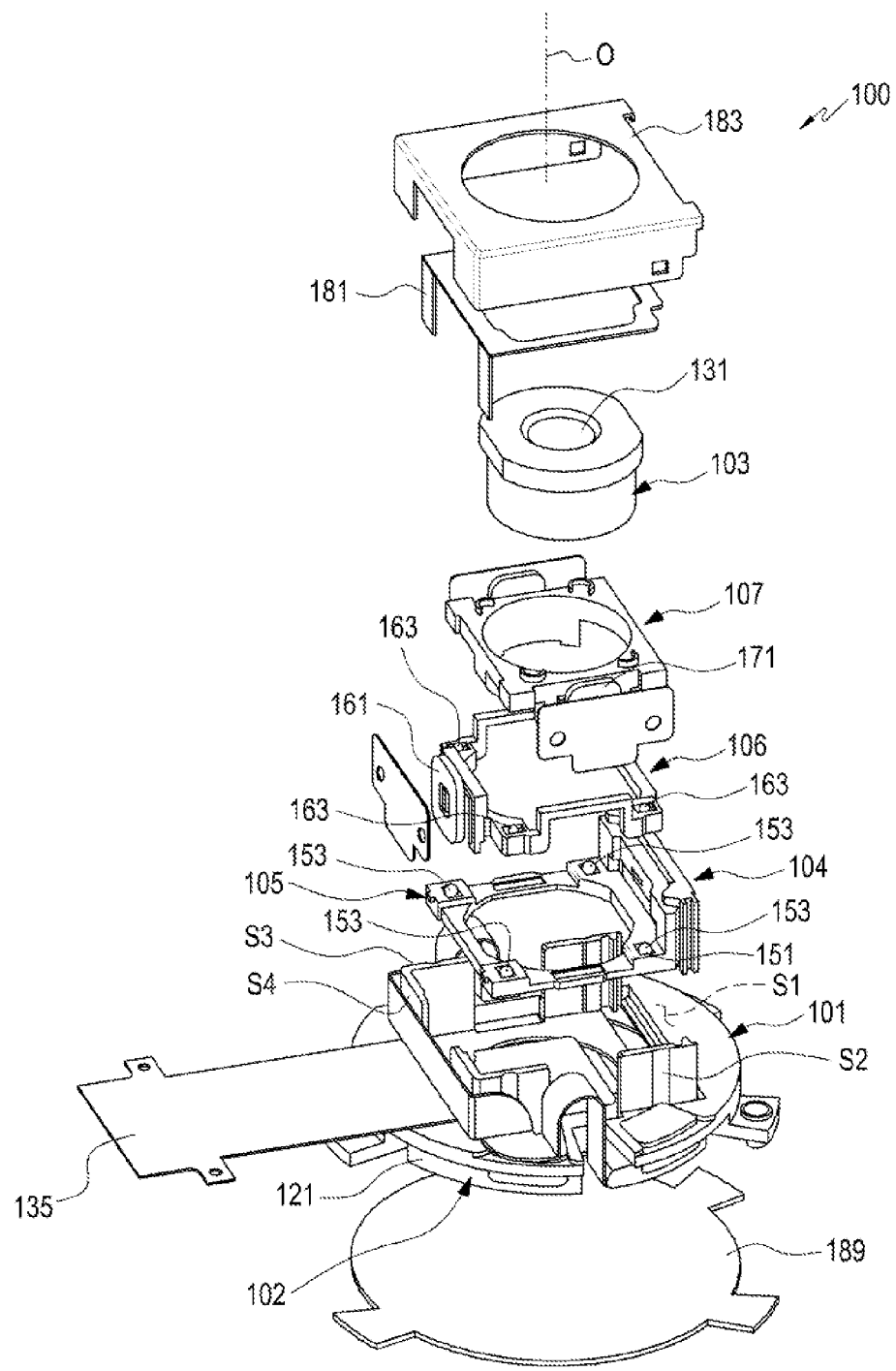
FIG. 4 is an exploded perspective view illustrating a lens assembly according to one of various embodiments of the present disclosure.

FIG. 4 is an exploded perspective view illustrating a lens assembly 100 according to one of various embodiments of the present disclosure.

Referring to FIG. 4, the lens assembly 100 may include the lens assembly 13a and/or 13b of the electronic device 10a and/or 10b illustrated in FIG. 1 and/or FIG. 2. The lens assembly 100 may include a housing 101, an image sensor assembly 102, and a lens barrel 103. The image sensor assembly 102 may compensate for shaking caused by rotational vibrations made with respect to an object by rotating with respect to the housing 101 and/or on a plane perpendicular to an optical axis O of the lens barrel 103. The image sensor assembly 102 may be positioned facing one surface (for example, a bottom surface) of the housing 101. To enable smooth rotation of the image sensor assembly 102, the lens barrel 103 and/or the image sensor assembly 102 may include a plurality of balls (225 in FIG. 5) interposed between the housing 101 and the image sensor assembly 102.

According to various embodiments, the lens assembly 100 may include a guide member 104, a first operation member 105, a second operation member 106, and/or a third operation member 107, so that the lens barrel 103 may be mounted in the housing 101. As described later, the guide member 104, the first operation member 105, the second operation member 106, and/or the third operation member 107 may advance or retreat the lens barrel 103 toward or from the image sensor assembly 102 along the optical axis O, or linearly move the lens barrel 103 in a direction perpendicular to the optical axis O, thereby providing an automatic focusing function and/or a OIS function.

The housing 101 may include sidewalls S1, S2, S3, and S4 extended upward from one surface of a circular plate, and the sidewalls S1, S2, S3, and S4 may form a space of a predetermined volume inside them, to thereby accommodate the lens barrel 103 or the like in the space. Each of the sidewalls S1, S2, S3, and S4 is partially open and may provide a space in which the guide member 104 and/or part of a later-described driving device (for example, a voice coil motor) may be mounted. According to an embodiment, at least one of the sidewalls S1, S2, S3, and S4 of the housing 101 may be formed by the guide member 104 or at least part of the driving device. For example, the first sidewall S1 of the housing 101 is open, and as the guide member 104 is mounted, the first sidewall S1 of the housing 101 may be substantially closed. According to various embodiments, the housing 101 may provide an open path along the optical axis O of the lens barrel 103. The open path provided by the housing 101 may be a path in which light is incident on the image sensor assembly 102.

The image sensor assembly 102 may include an image sensor (not shown) for detecting image information (for example, information about a contrast ratio, brightness, color, and the like) about an object from light incident through the housing 101 and/or the lens barrel 103, and a flexible printed circuit board (FPCB) 135 for connecting the image sensor to a main circuit board of an electronic device (for example, the electronic device 10a and/or 10b illustrated in FIG. 1 and/or FIG. 2), on which an AP (for example, the AP 21 in FIG. 3) is mounted. In an embodiment, the image sensor assembly 102 may include a rotation member 121 which is engaged with the bottom surface of the housing 101, facing the bottom surface of the housing 101. The rotation member 121 may rotate around the optical axis O with respect to the housing 101. For example, the rotation member 121 may rotate on a plane perpendicular to the optical axis O. A structure in which the image sensor 102 rotates in engagement with the housing 101 will be described in greater detail with reference to FIG. 5.

According to various embodiments, to prevent the image sensor assembly 102 from slipping off from the housing 101, the lens assembly 100 may further include a lower housing 189. The lower housing 189 may be engaged with the bottom surface of the housing 101, partially surrounding the image sensor assembly 102. In an embodiment, the lower housing 189 may be formed by part of the casing 11a and/or 11b of the afore-described electronic device (for example, the electronic device 10a and/or 10b illustrated in FIG. 1 and/or FIG. 2) and/or a main circuit board inside the electronic device.

The lens barrel 103 may include at least one lens 131, and project light incident from an object to the image sensor assembly 102. According to various embodiments, the lens barrel 103 may linearly move along the optical axis O and/or in a direction perpendicular to the optical axis O. In an embodiment, the guide member 104, and the first, second, and third operation members 105, 106, and 107 may be mounted in the housing 101, in a state where they may move the lens barrel 103 linearly.

According to various embodiments, with the lens barrel 103 accommodated and installed in the housing 101, each of a first cover member 181 and a second cover member 183 may be mounted to the housing 101. The first cover member 181 may be positioned inside of the second cover member 183 and restrict a range of advancing and retreating movements of the lens barrel 103 along the optical axis O. The second cover member 183 may close a top surface of the housing 101, thus completing the lens assembly 100. The second cover member 183 may provide an opening through which light is incident on the lens barrel 103. In an embodiment, the second cover member 183 may be used as a shielding member for shielding the lens assembly 100 electro-magnetically from an ambient environment.

The guide member 104 may be engaged with the housing 101, forming the first sidewall S1. For example, both ends of the guide member 104 may be fixed to inner surfaces of the second and third sidewalls S2 and S3, thus forming the first sidewall S1 which is closed. The guide member 104 may provide a means for installing the first operation member 105. According to various embodiments, the first operation member 105 may be installed to the guide member 104, and thus may advance and retreat along the optical axis O. Along with the advancing and retreating movement of the first operation member 105, the lens barrel 103 may execute the automatic focusing function by advancing and retreating along the optical axis O.

While not shown, to advance or retreat the first operation member 105, the lens assembly 100 and/or the electronic device (for example, the electronic device 10a and/or 10b illustrated in FIG. 1 and/or FIG. 2) may include a driving device (not shown). For example, a coil may be attached to the guide member 104 and a magnet may be attached to the first operation member 105, the coil and the magnet facing each other. As an electrical signal is applied to the coil, the first operation member 105 may advance or retreat by an electromagnetic force generated between the coil and the magnet.

In an embodiment, the lens assembly 100 may include one or more first guide grooves extended in one direction on one surface (for example, a top surface) of the first operation member 105, and one or more balls 153 inserted in the one or more first guide grooves 151. The balls 153 may protrude partially from the top surface of the first operation member 105, while being accommodated in the first guide grooves 151. According to various embodiments, the second operation member 106 may be mounted on the first operation member 105, and make a linear reciprocal movement in a first direction perpendicular to the optical axis O, supported by the balls 153. The direction in which the second operation member 106 linearly moves may be a direction in which the first guide grooves 151 are extended. When the second operation member 106 moves linearly, the balls 153 may make point-contact with the second operation member 106, thereby suppressing and mitigating friction caused by the linear movement. For example, the balls 153 may make the linear movement of the second operation member 106 smooth.

In an embodiment, the lens assembly 100 may include a first coil 161 installed to the fourth sidewall S4 of the housing 101, and a first magnet (not shown) installed to the second operation member 106. As an electrical signal is applied to the first coil 161, the second operation member 106 may move linearly on the first operation member 105 by an electromagnetic force generated between the first coil 161 and the first magnet.

According to various embodiments, the lens assembly 100 may include one or more other balls 163 mounted on the second operation member 106. While not indicated by a reference numeral, one or more second guide grooves may be extended in another direction on one surface of the second operation member 106, to accommodate the other balls 163. The other balls 163 may be accommodated in the one or more second guide grooves, protruding from the top surface of the second operation member 106. In an embodiment, when the second operation member 106 is mounted on the first operation member 105, the second guide grooves may be extended in a direction perpendicular to the direction in which the first guide grooves 151 are extended.

According to various embodiments, the lens barrel 103 may be mounted on the third operation member 107, and the third operation member 107 may be mounted on the second operation member 106, supported by the other balls 163. In an embodiment, the lens barrel 103 may be disposed, surrounded by the first, second, and/or third operation member 105, 106, and/or 107. For example, each of the first, second, and/or third operation member 105, 106 and/or 107 may have a frame structure shaped into a closed loop, and may be arranged to surround the lens barrel 103. The third operation member 107 may make a linear reciprocal movement in a second direction perpendicular to the optical axis O on the second operation member 106, supported by the other balls 163. In an embodiment, the second direction may be perpendicular to the first direction.

In another embodiment, the lens assembly 100 may include one or more second coils 171 mounted to the second and/or third sidewall S2 and/or S3 of the housing 101, and one or more second magnets (not shown) mounted to the third operation member 107. As an electrical signal is applied to the second coils 171, the third operation member 107 may move linearly on the second operation member 106 by an electromagnetic force generated between the second coils 171 and the second magnets.

According to various embodiments, along with the linear movement of each of the first, second, and/or third operation member 105, 106, and/or 107, the lens barrel 103 may move linearly along the optical axis O and/or in each of the first and second directions perpendicular to the optical axis O. For example, if the first operation member 105 advances and retreats along the optical axis O, the lens barrel 103 may execute the automatic focusing function, while also advancing and retreating along the optical axis O. In another example, as each of the second and/or third operation member 106 and/or 107 moves linearly in the first and/or second direction, the lens barrel 103 may execute the OIS function, while also linearly moving in a direction perpendicular to the optical axis O.

The foregoing embodiment is merely an example of the automatic focusing function (or apparatus) or the OIS function (or apparatus). The present disclosure is not limited thereto and may be implemented in various manners according to embodiments. The above automatic focusing function (or apparatus) or OIS function (or apparatus) may be understood more easily by Korean Patent Laid-Open Publication No. 10-2014-0144126 filed by the same applicant (publicized on Dec. 18, 2014 and publicized in U.S. Patent Laid-Open Publication No. US2014/0362284 on Dec. 11, 2014).

Figure 5:
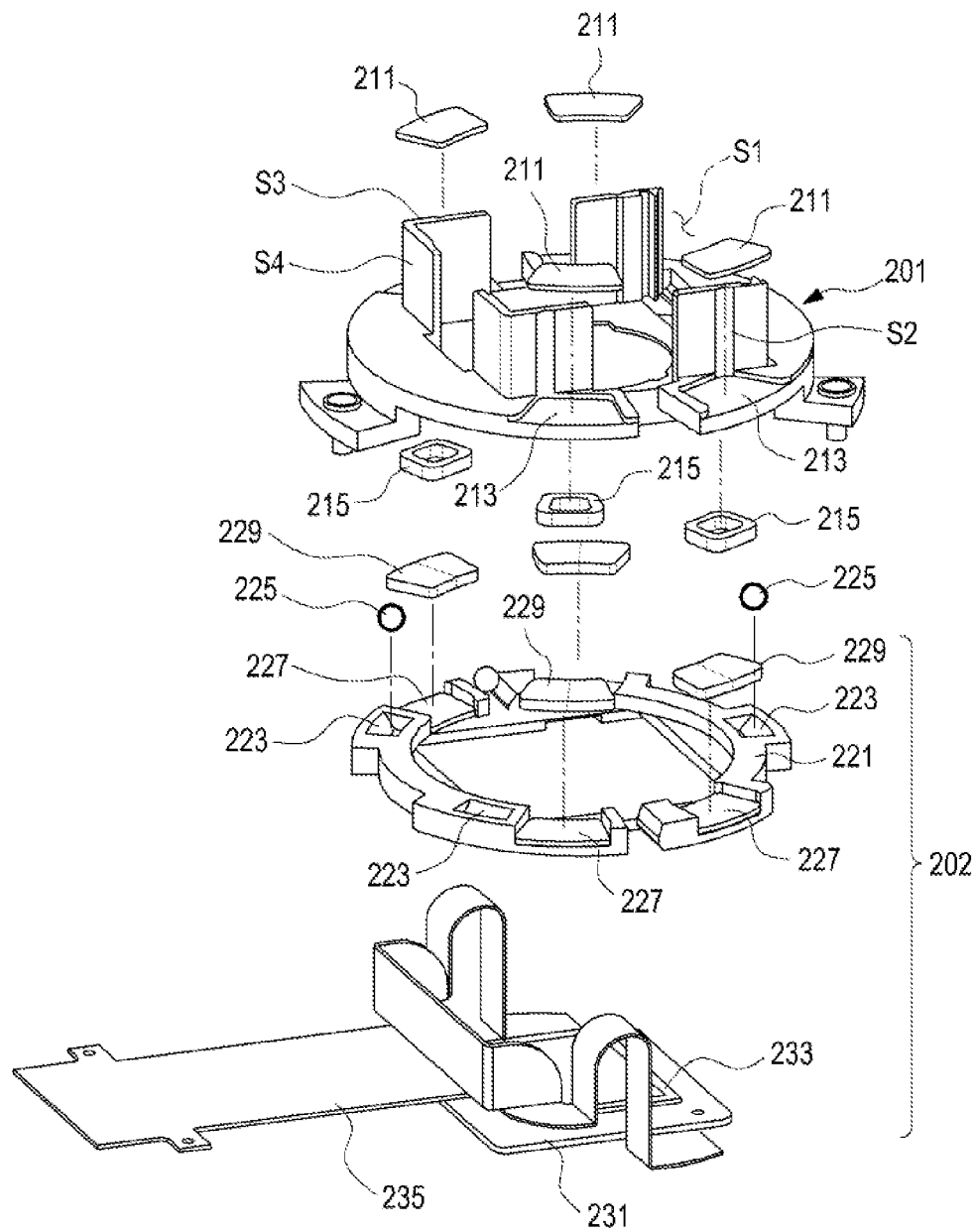
FIG. 5 is an exploded perspective view illustrating a structure for compensating for shaking caused by rotational vibrations in a lens assembly according to one of various embodiments of the present disclosure.

FIG. 5 is an exploded perspective view illustrating a structure for compensating for shaking caused by rotational vibrations in a lens assembly according to one of various embodiments of the present disclosure.

Figure 6:
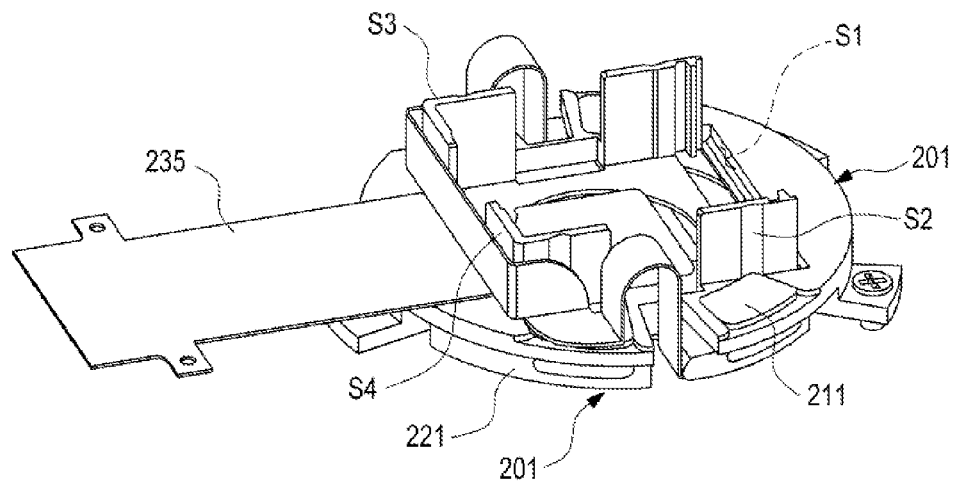
FIG. 6 is an assembled perspective view illustrating a structure for compensating for shaking caused by rotational vibrations in a lens assembly according to one of various embodiments of the present disclosure.

FIG. 6 is an assembled perspective view illustrating a structure for compensating for shaking caused by rotational vibrations in a lens assembly according to one of various embodiments of the present disclosure.

Referring to FIGS. 5 and 6, an image sensor assembly 202 (for example, the image sensor assembly 102 in FIG. 4) of a lens assembly (for example, the lens assembly 100 in FIG. 4) according to various embodiments may be rotatably engaged with a housing 201 (for example, the housing 101 in FIG. 4).

The housing 201 may include a plurality of sidewalls S1, S2, S3, and S4 formed on one surface (for example, a top surface) of the housing 201. As described before, each of the sidewalls S1, S2, S3, and S4 may be open at least partially. In an embodiment, as a guide member (for example, the guide member 104 in FIG. 4) is mounted, the first sidewall S1 may be substantially closed. The sidewalls S1, S2, S3, and S4 may collectively provide a space for accommodating and installing the foregoing lens barrel (for example, the lens barrel 103 in FIG. 4).

The image sensor assembly 202 may be engaged with the other surface (for example, a bottom surface) of the housing 202, facing the other surface of the hosing 202, and may rotate around an optical axis (for example, the optical axis O in FIG. 4) of the lens barrel. For example, when rotational vibrations cause shaking, the image sensor assembly 202 may rotate with respect to the housing 201 and/or the lens barrel, thereby compensating for the shaking of a captured image caused by the rotational vibrations.

According to various embodiments, the image sensor assembly 202 may include a rotation member 221 and a plurality of balls 225. The rotation member 221 may be a ring-shaped plate facing the other surface of the housing 201, and the balls 225 may be interposed between the housing 201 and the rotation member 221. To arrange the balls 225, the image sensor assembly 202 may include a plurality of grooves 223 formed on one surface of the rotation member 221. The grooves 223 may be extended within a predetermined angle range along a rotation direction of the rotation member 221. Each of the balls 225 may be accommodated in one of the grooves 223, protruding from the one surface of the rotation member 221 and contacting (for example, point-contacting) the housing 201. While the rotation member 221 is rotating with respect to the housing 201, the balls 225 may suppress or mitigate friction between the rotation member 221 and the housing 201 by rolling movement.

According to various embodiments, the image sensor assembly 202 may include a circuit board 231 installed to the rotation member 221, an image sensor 233 mounted on the circuit board 231, and/or an FPCB 235 extended from the circuit board 231. The circuit board 231 and/or the image sensor 233 may be mounted onto the bottom surface of the rotation member 221, and face the lens barrel (for example, the lens barrel 103 in FIG. 4) through an opening formed in the rotation member 221. The circuit board 231 may provide an area in which the image sensor 233 is mounted, and a path in which the image sensor 233 is connected to a processor (for example, the AP 21 in FIG. 3) of the electronic device. For example, the circuit board 231 may be connected to the main circuit board of the electronic device through the FPCB 235, and the image sensor 233 may be connected to the processor provided on the main circuit board of the electronic device through the circuit board 231. The processor of the electronic device may generate an image based on information (for example, information about a contrast ratio, brightness, color, and so on of an object) detected through the image sensor 233, and the image generated by the processor may be stored in a memory (for example, the memory 23 in FIG. 3) or output through a display (for example, the display 26 in FIG. 3).

According to various embodiments, the lens assembly (for example, the lens assembly 100 in FIG. 4) may include a driving device for rotating the image sensor assembly 202, for example, the rotation member 221 with respect to the housing 201. In an embodiment, the driving device may include third coils 215 and magnetic bodies (hereinafter, referred to as third magnets 229) corresponding to the third coils 215, and the rotation member 221 may rotate with respect to the housing 201 by an electromagnetic force generated between the third coils 215 and the third magnets 229.

According to various embodiments, the lens assembly may include first yokes 211 on one surface of the housing 201. The housing 201 may include mounting grooves 213 formed on one surface (for example, the top surface) of the housing 201, and the first yokes 211 may be mounted in the mounting grooves 213. The first yokes 211 may concentrate an electromagnetic field generated by the third coils 215 and/or the third magnets 229 in a predetermined area (or space). The third coils 215 are interposed between the first yokes 211 and the rotation member 221 and may be installed to the housing 201. The third magnets 229 may be mounted on the rotation member 221, between the first yokes 211 and the rotation member 221. According to another embodiment, the third coils 215 may be mounted to the rotation member 221, and the third magnets 229 may be mounted to the housing 201. In an embodiment, second yokes 227 corresponding to the first yokes 211 may also be mounted to the rotation member 221, and the third coils 215 and the third magnets 229 may face each other between the first and second yokes 211 and 227. As far as a driving force for rotating the rotation member 221 with respect to the housing 201 can be generated, the third coils 215 and the third magnets 229 may be mounted at various positions on the housing 201 and the rotation member 221.

According to various embodiments, the rotation member 221 may be maintained to be engaged with the bottom surface of the housing 201 by a magnetic force (for example, an attractive force) generated between the first yokes 211 and the third magnets 229. As the balls 225 contact the bottom surface of the housing 201 with the rotation member 221 engaged with the bottom surface of the housing 201, a gap may be produced between the rotation member 221 and the housing 201. In an embodiment, when an electrical signal is applied to the third coils 215, an electromagnetic force generated between the third coils 215 and the third magnets 229 may rotate the rotation member 221 with respect to the housing 201.

According to various embodiments, the grooves 223 may guide the rotation direction of the rotation member 221 during rotation of the rotation member 221. For example, the grooves 223 may be extended along an arc trace around the optical axis O of the lens barrel, and the rotation member 221 may rotate around the optical axis O, under the guidance of the balls 225 and the grooves 223. According to various embodiments, since the optical axis O moves in the first direction and/or the second direction according to an OIS operation, the position of the optical axis O may not be fixed. In an embodiment, the grooves 223 may be formed along an arc trace around one of various positions to which the optical axis O may move.

With reference to FIGS. 7 to 12, a detailed description will be given below of a structure in which a lens barrel of a lens assembly is mounted in a housing according to various embodiments of the present disclosure. In the description of the structure in which a lens barrel is mounted in a housing, a detailed description of components having similar mounting structures or functions disclosed in different embodiments will be omitted.

Figure 7:
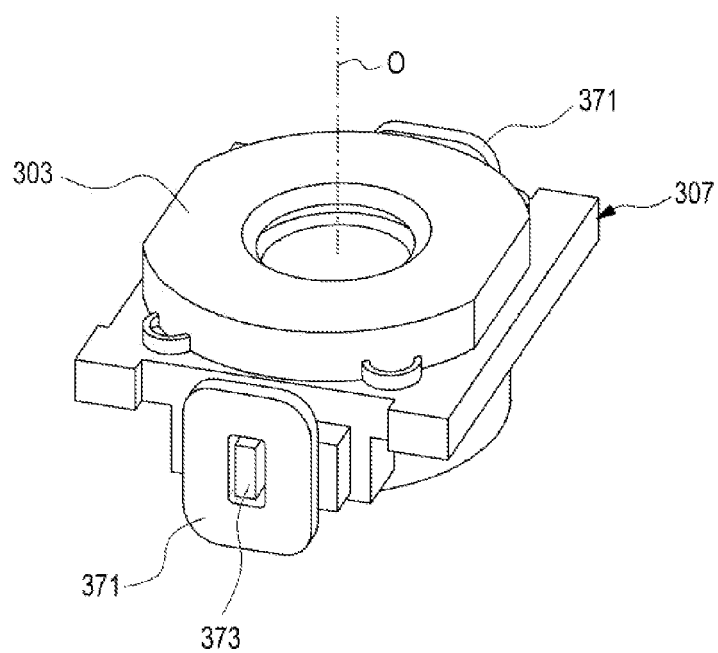
FIG. 7 is a perspective view illustrating assembly of a lens barrel with a third operation member in a lens assembly according to one of various embodiments of the present disclosure.

FIG. 7 is a perspective view illustrating assembly of a lens barrel 303 with a third operation member 307 in a lens assembly according to one of the various embodiments of the present disclosure.

Referring to FIG. 7, the lens barrel 303 (for example, the lens barrel 103 in FIG. 4) may be fixed to the third operation member 307, at least partially surrounded by the third operation member 307. Coils 371 (for example, the second coils 171 in FIG. 4) may be mounted on both sides of the third operation member 307. The coils 371 may be mounted on sidewalls of a housing (for example, the second and third sidewalls S2 and S3 of the housing in FIG. 4), and magnets (not shown) may be mounted to the third operation member 307, facing the coils 371. In an embodiment, position sensors 373 may be mounted, together with the coils 371, to the sidewalls of the housing (for example, the second and third sidewalls S2 and S3 of the housing in FIG. 4). The position sensors 373 may include, for example, hall sensors, and detect the position of the third operation member 307 with respect to the housing.

Figure 8:
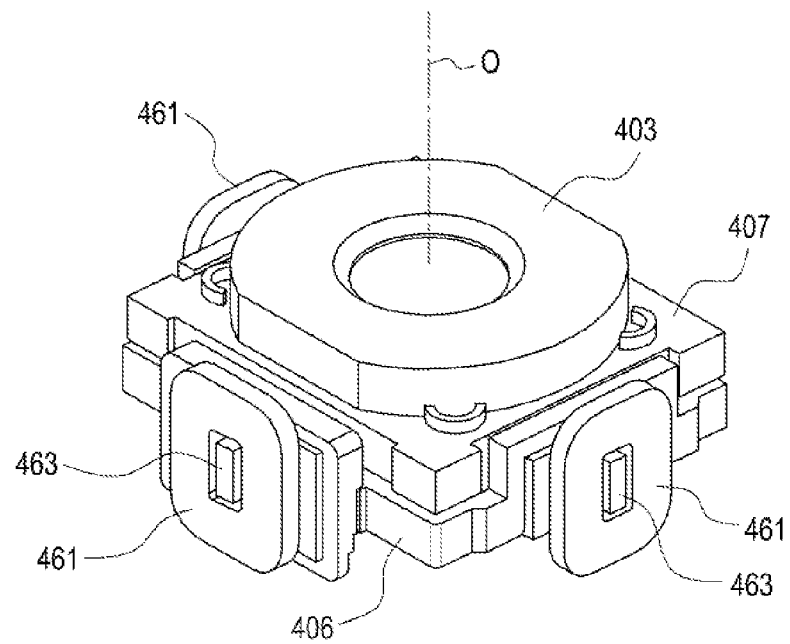
FIG. 8 is a perspective view illustrating assembly of a third operation member with a second operation member in a lens assembly according to one of various embodiments of the present disclosure.

FIG. 8 is a perspective view illustrating assembly of a third operation member 407 with a second operation member 406 in a lens assembly according to one of the various embodiments of the present disclosure.

Referring to FIG. 8, the third operation member 407 (for example, the third operation member 307 in FIG. 7) engaged with a lens barrel 403 (for example, the lens barrel 303 in FIG. 7) may be mounted on the second operation member 406, for example, a top surface of the second operation member 406. Balls (for example, the balls 163 in FIG. 4) may be interposed between the second and third operation members 406 and 407 and thus guide a linear movement of the third operation member 407.

Having been fixed to the third operation member 407, the lens barrel 403 may be mounted on the second operation member 406, at least partially surrounded by the second operation member 406. A coil 461 (for example, the first coil 161 in FIG. 4) may be disposed at a side of the second operation member 406. The coil 461 may be mounted on a sidewall of a housing (for example, the fourth sidewall S4 of the housing in FIG. 4), and a magnet (not shown) may be mounted to the second operation member 406, facing the coil 461. In an embodiment, a position sensor 463 may be mounted, together with the coil 461, to the sidewall of the housing (for example, the fourth sidewall S4 of the housing in FIG. 4). The position sensor 463 may be, for example, a hall sensor and detect the position of the second operation member 406 with respect to the housing.

Figure 9:
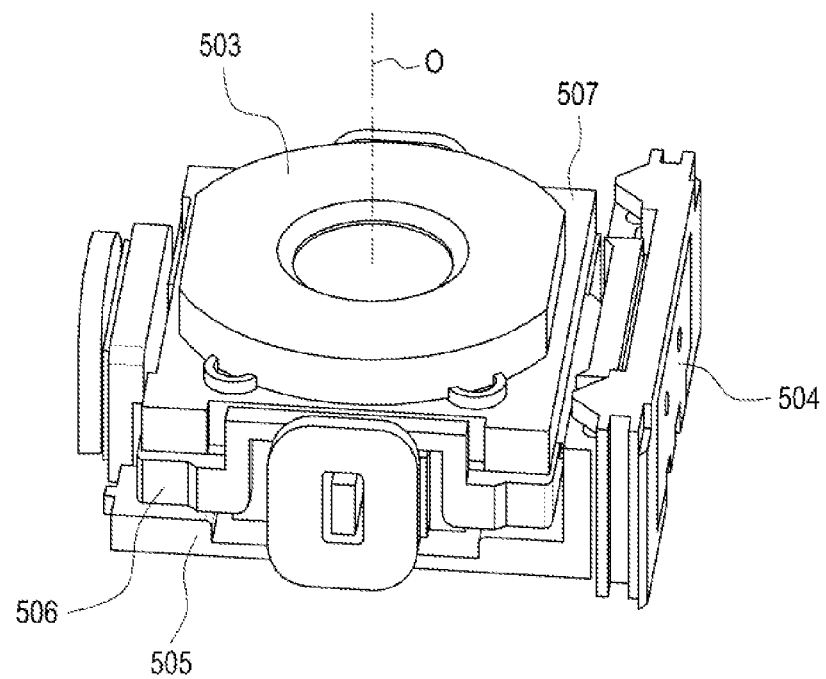
FIG. 9 is a perspective view illustrating assembly of a second operation member with a first operation member in a lens assembly according to one of various embodiments of the present disclosure.

FIG. 9 is a perspective view illustrating assembly of a second operation member 506 with a first operation member 505 in a lens assembly according to one of various embodiments of the present disclosure.

Referring to FIG. 9, the second operation member 506 (for example, the second operation member 406 in FIG. 8) may be mounted on the first operation member 505, for example, a top surface of the first operation member 505. Balls (for example, the balls 153 in FIG. 4) may be interposed between the first and second operation members 505 and 506, and guide a linear movement of the second operation member 506.

Having been fixed to a third operation member 507, a lens barrel 503 may be mounted on the first operation member 505, together with the second operation member 506, at least partially surrounded by the first operation member 505. The first operation member 505 may be engaged with a guide member 504 (for example, the guide member 104 in FIG. 4), and thus may advance and retreat along the optical axis O under the guidance of the guide member 504. A driving device (for example, a voice coil motor) and balls may be interposed between the guide member 504 and the first operation member 505, and thus may provide a driving force for advancing and retreating the first operation member 505, thereby suppressing or mitigating friction caused by the advancing and retreating movement.

Figure 10:
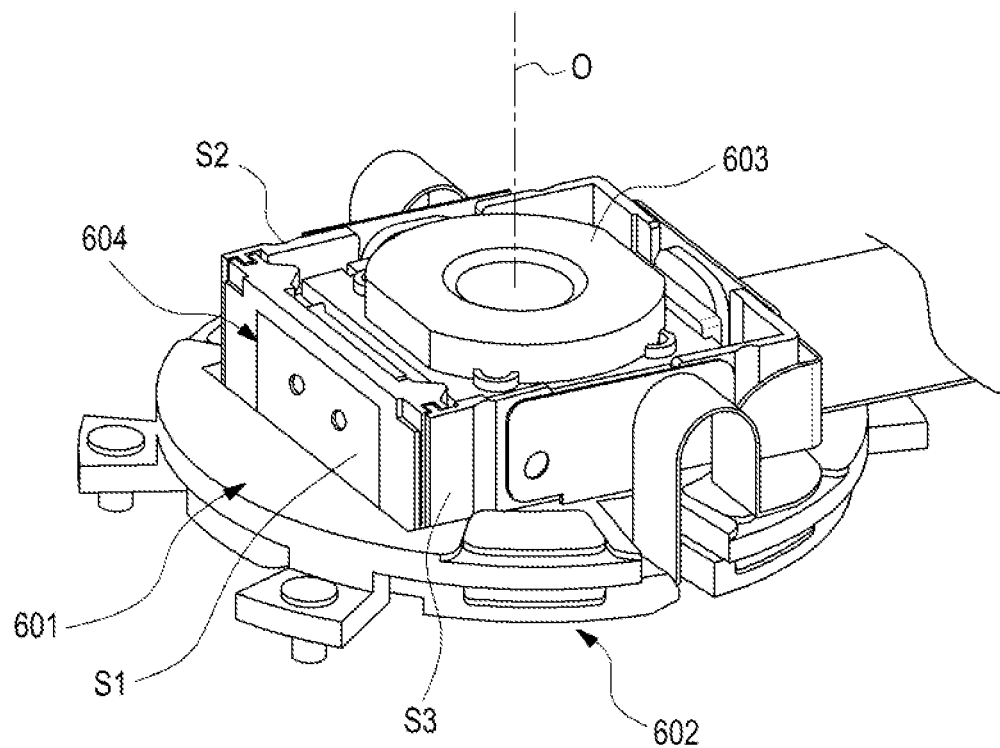
FIG. 10 is a perspective view illustrating assembly of a first operation member and/or a guide member with a housing in a lens assembly according to one of various embodiments of the present disclosure.

FIG. 10 is a perspective view illustrating assembly of a first operation member and/or a guide member 604 with a housing 601 in a lens assembly according to one of various embodiments of the present disclosure.

Figure 11:
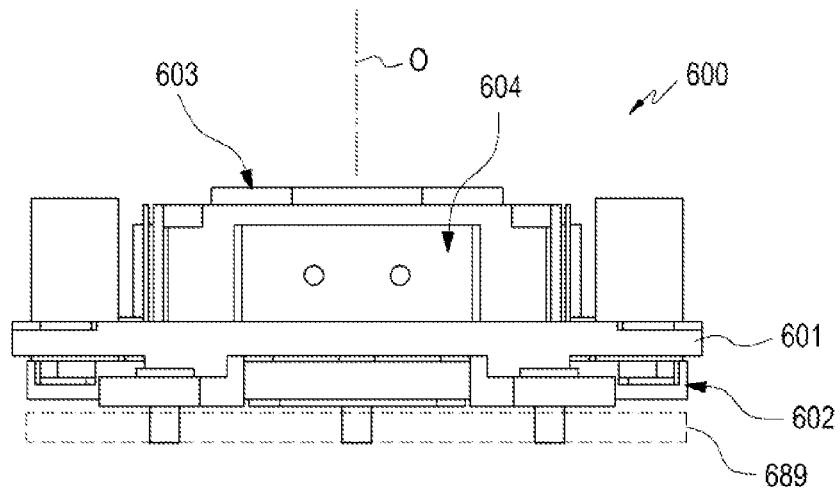
FIG. 11 is a side view illustrating a lens assembly according to one of various embodiments of the present disclosure.

FIG. 11 is a first side view illustrating a lens assembly 600 according to one of various embodiments of the present disclosure.

Figure 12:
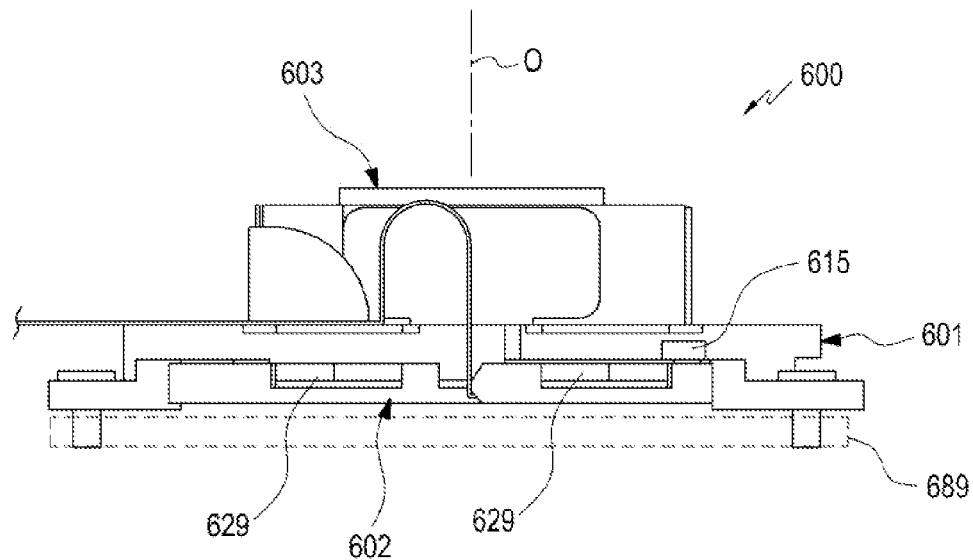
FIG. 12 is another side view illustrating a lens assembly according to one of various embodiments of the present disclosure.

FIG. 12 is a second side view illustrating the lens assembly 600 according to one of various embodiments of the present disclosure.

Referring to FIGS. 10, 11, and 12, the guide member 604 may be mounted between second and third sidewalls (for example, the second and third sidewalls S2 and S3 in FIG.

4) of the housing 601, closing a first sidewall S1 of the housing 601. Once the guide member 604 is mounted in the housing 601, first, second, and third operation members (for example, the first, second, and third operation members 505, 506, and 507 in FIG. 9) and/or a lens barrel 603 (for example, the lens barrel 503 in FIG. 9) may be accommodated in a space formed by the sidewalls of the housing 601. In an embodiment, a part of the lens barrel 603 may protrude from top ends of the sidewalls. According to various embodiments, first and second cover members (for example, the first and second cover members 181 and 183 in FIG. 4) may be engaged with the housing 601, thus completing the lens assembly 600.

In an embodiment, the lens assembly 600 may further include another position sensor 615 mounted to the housing 601, and a lower housing 689 engaged with a bottom surface of the housing 601. The position sensor 615 may detect a rotation position of an image sensor assembly 602, for example, the rotation member 221 illustrated in FIG. 5. According to various embodiments, a processor (for example, the AP 21 in FIG. 3) of an electronic device may control rotation of the image sensor assembly 602 based on the position of the rotation member detected by the position sensor 615 and rotational vibrations detected by a gyro sensor (for example, the gyro sensor 24b in FIG. 3), an accelerometer sensor (for example, the accelerometer sensor 24e in FIG. 3), or the like. For example, as the processor of the electronic device applies an electrical signal to the coils 215 illustrated in FIG. 5, a rotation member (for example, the rotation member 221 in FIG. 5) may rotate with respect to the housing 601 by an electromagnetic force generated between the coils and magnets 629.

The lower housing 689 may prevent the image sensor assembly 602, for example, the rotation member from slipping off from the housing 601. The lower housing 689 may be engaged with the bottom surface of the housing 601, surrounding the image sensor assembly 602 at least partially. Therefore, the lower housing 689 may protect the image sensor assembly 602, while locking the image sensor assembly 602 on the housing 601. In an embodiment, the image sensor assembly 602 may be maintained in engagement with the housing 601 by an attractive force generated between yokes (for example, the first yokes 211 in FIG. 5) installed to the housing 601 and the magnets 629 mounted to the rotation member (for example, the rotation member 221 in FIG. 5). According to various embodiments, as the lower housing 689 is engaged with the housing 601, reliability of the lens assembly 600 may be increased. For example, the image sensor assembly 602 may be prevented from slipping off from the housing 601, in spite of an external impact.

Figure 13:
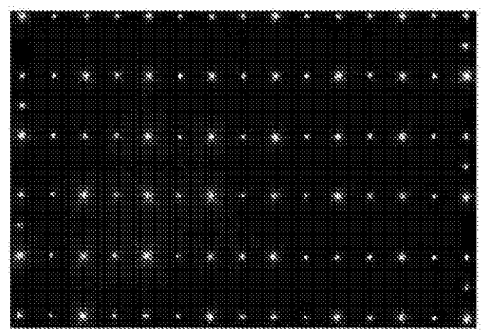
FIG. 13 illustrates an image captured through a lens assembly during compensation for shaking caused by rotational vibrations according to one of various embodiments of the present disclosure.

FIG. 13 illustrates an image captured through a lens assembly during compensation for shaking caused by rotational vibrations according to one of various embodiments of the present disclosure.

Figure 14:
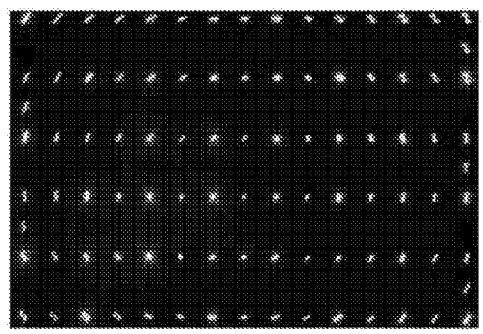
FIG. 14 illustrates an image captured through a lens assembly in a state where shaking caused by rotational vibrations is not compensated for according to one of various embodiments of the present disclosure.

FIG. 14 illustrates an image captured through a lens assembly in a state where shaking caused by rotational vibrations is not compensated for according to one of various embodiments of the present disclosure.

Referring to FIGS. 13 and 14, an object image is less clear at a position farther from the center of the rotational vibrations. A lens assembly (for example, the lens assembly 100 in FIG. 4) and/or an electronic device (for example, the electronic device 10a and/or 10b in FIG. 1 and/or FIG. 2) including the lens assembly according to various embodiments of the present disclosure may increase the quality of a captured image by performing operations including automatic focusing, OIS, compensation for shaking caused by rotational vibrations, and so on during capturing the image of an object.

Figure 15:
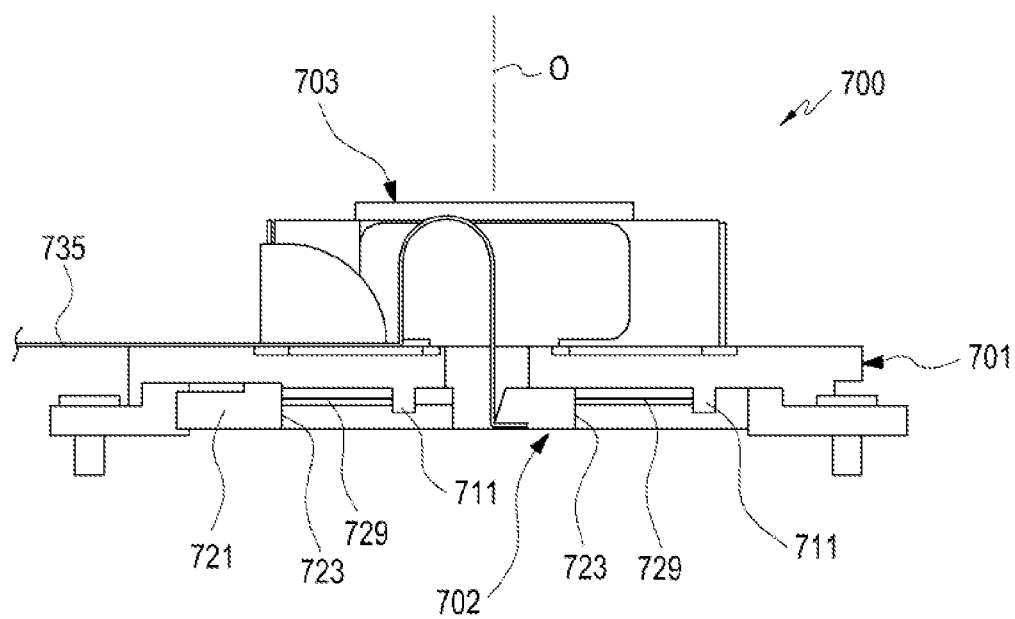
FIG. 15 is a side view illustrating a lens assembly according to another of the various embodiments of the present disclosure.

FIG. 15 is a side view illustrating a lens assembly 700 according to another of the various embodiments of the present disclosure.

Referring to FIG. 15, a lens assembly 700 may include a housing 701, a lens barrel 703 accommodated in the housing 701, and an image sensor assembly 702 rotatably engaged with a bottom surface of the housing 701. The image sensor assembly 702 may rotate around the optical axis O of the lens barrel 703. In an embodiment, the image sensor assembly 702 may be connected to a main circuit board of an electronic device through a wiring such as an FPCB 735.

According to various embodiments, since a driving wire 729 containing a shape memory alloy material provides a driving force, the image sensor assembly 702 may rotate with respect to the housing 701. In an embodiment, the lens assembly 700 may further include a first fixing piece 711 extended from one surface (for example, the bottom surface) of the housing 701, and a second fixing piece 723 (or a wall) formed in a rotation member 721 of the image sensor assembly 702. When the rotation member 721 is engaged with the bottom surface of the housing 701, the second fixing piece 723 may face the first fixing piece 711, and the driving wire 729 may be installed between the first and second fixing pieces 711 and 723. For example, one end of the driving wire 729 may be connected to the first fixing piece 711, and the other end of the driving wire 729 may be connected to the second fixing piece 723. Since the driving wire 729 is contracted or expanded by receiving an electrical signal or the like, the driving wire 729 may rotate the rotation member 702 with respect to the housing 701.

While a voice coil motor being a combination of a coil and a magnet, and a driving wire containing a shape memory alloy material are presented as a driving device for rotating a rotation member with respect to a housing, by way of example, in the specific embodiments of the present disclosure, the present disclosure is not limited thereto. For example, a driving device for rotating a rotation member with respect to a housing may be a step motor, a servo motor, or the like.

As described before, a lens assembly according to various embodiments of the present disclosure may include a lens barrel, a housing for accommodating the lens barrel on one surface of the housing, and an image sensor assembly mounted to the other surface of the housing, for rotating around an optical axis of the lens barrel. The image sensor assembly may include a ring-shaped rotation member facing the other surface of the housing, and a plurality of balls interposed between the rotation member and the other surface of the housing. The rotation member may rotate on a plane perpendicular to the optical axis.

According to various embodiments, the image sensor assembly may further include a plurality of grooves formed on one surface of the rotation member, and each of the plurality of balls may be accommodated in one of the grooves, protruding from the one surface of the rotation member and contacting the other surface of the housing.

According to various embodiments, the lens assembly may further include at least one first yoke mounted to the housing, at least one coil mounted to one of the housing and the rotation member, between the rotation member and the at least one first yoke, and at least one magnetic body mounted to the other of the housing and the rotation member, between the rotation member and the at least one first yoke. The rotation member may rotate by an electromagnetic force generated between the at least one coil and the at least one magnetic body.

According to various embodiments, the lens assembly may further include a second yoke mounted to the rotation member, in correspondence with the at least one first yoke.

According to various embodiments, the lens assembly may further include a first fixing piece extended from the other surface of the housing, a second fixing piece formed on a sidewall of the rotation member, and configured to face the first fixing piece when the rotation member is engaged with the other surface of the housing, and a driving wire having one end fixed to the first fixing piece and the other end fixed to the second fixing piece. The driving wire may contain a shape memory alloy material, and the rotation member may be rotated by deformation of the driving wire.

According to various embodiments, the image sensor assembly may further include a circuit board mounted on the rotation member, an image sensor mounted on the circuit board, and an opening formed in the rotation member. The image sensor may face the lens barrel through the opening.

According to various embodiments, the lens assembly may further include a guide member mounted to the housing and forming a first sidewall of the housing, and a first operation member mounted to the guide member, for advancing and retreating along the optical axis on the housing.

According to various embodiments, the lens assembly may further include a second operation member mounted to the first operation member, for making a linear reciprocal movement in a first direction perpendicular to the optical axis, and a third operation member mounted to the second operation member, for making a linear reciprocal movement in a second direction perpendicular to each of the first direction and the optical axis. The lens barrel may be mounted on the third operation member.

According to various embodiments, the lens assembly may further include one or more balls interposed between the first operation member and the second operation member and between the second operation member and the third operation member.

According to various embodiments, the lens assembly may further include a position sensor mounted to the housing, for detecting a rotation position of the rotation member.

According to various embodiments of the present disclosure, an electronic device may include a lens assembly, an image sensor for detecting image information based on light incident through the lens assembly, and a processor for generating an image based on the image information detected through the image sensor. The lens assembly may include a lens barrel, a housing for accommodating the lens barrel on one surface of the housing, and an image sensor assembly mounted to the other surface of the housing, for rotating on a plane perpendicular to an optical axis of the lens barrel. The image sensor assembly may include a ring-shaped rotation member facing the other surface of the housing, and a plurality of balls interposed between the rotation member and the other surface of the housing. The image sensor may be mounted to the rotation member.

According to various embodiments, the image sensor assembly may further include a plurality of grooves formed on one surface of the rotation member, and each of the plurality of balls may be accommodated in one of the grooves, protruding from the one surface of the rotation member and contacting the other surface of the housing.

According to various embodiments, the lens assembly may further include at least one first yoke mounted to the housing, at least one coil mounted to one of the housing and the rotation member, between the rotation member and the at least one first yoke, and at least one magnetic body mounted to the other of the housing and the rotation member, between the rotation member and the at least one first yoke. The rotation member may rotate by an electromagnetic force generated between the at least one coil and the at least one magnetic body.

According to various embodiments, the lens assembly may further include a second yoke mounted to the rotation member, in correspondence with the at least one first yoke.

According to various embodiments, the lens assembly may further include a first fixing piece extended from the other surface of the housing, a second fixing piece formed on a sidewall of the rotation member, and configured to face the first fixing piece when the rotation member is engaged with the other surface of the housing, and a driving wire having one end fixed to the first fixing piece and the other end fixed to the second fixing piece. The driving wire may contain a shape memory alloy material, and the rotation member may be rotated by deformation of the driving wire.

According to various embodiments, the image sensor assembly may further include a circuit board mounted on the rotation member, and an opening formed in the rotation member. The image sensor may face the lens barrel through the opening.

According to various embodiments, the lens assembly may further include a guide member mounted to the housing and forming a first sidewall of the housing, and a first operation member mounted to the guide member, for advancing and retreating along the optical axis on the housing.

According to various embodiments, the lens assembly may further include a second operation member mounted to the first operation member, for making a linear reciprocal movement in a first direction perpendicular to the optical axis, and a third operation member mounted to the second operation member, for making a linear reciprocal movement in a second direction perpendicular to each of the first direction and the optical axis. The lens barrel may be mounted on the third operation member.

According to various embodiments, the lens assembly may further include one or more balls interposed between the first operation member and the second operation member and between the second operation member and the third operation member.

According to various embodiments, the lens assembly may further include a position sensor mounted to the housing, for detecting a rotation position of the rotation member.

As is apparent from the foregoing description of a lens assembly and an electronic device including the lens assembly according to various embodiments of the present disclosure, since an image sensor is rotated with respect to an object, shaking of a captured image caused by rotational vibrations of a user's body or the like can be compensated for. In an embodiment, a capturing device, for example, the lens assembly or the electronic device includes a structure for compensating for shaking caused by rotational vibrations, and further the structure for compensating for shaking caused by rotational vibrations is incorporated with an automatic focusing device and/or an OIS device. Thus, the capturing device can perform automatic focusing and/or OIS. For example, the lens assembly and/or the electronic device including the lens assembly according to various embodiments of the present disclosure can improve the quality of a captured image by correcting various types of shaking that may be produced during capturing.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A lens assembly comprising:
a lens barrel;
a housing configured to accommodate the lens barrel on one surface of the housing; and
an image sensor assembly mounted to another surface of the housing, the image sensor assembly being configured to rotate around an optical axis of the lens barrel,
wherein the image sensor assembly comprises:
a ring-shaped rotation member facing the other surface of the housing; and
a plurality of balls interposed between the rotation member and the other surface of the housing, and
wherein the rotation member rotates on a plane perpendicular to the optical axis.

2. The lens assembly of claim 1,
wherein the image sensor assembly further comprises a plurality of grooves formed on one surface of the rotation member, and
wherein each of the plurality of balls is accommodated in one of the plurality of grooves, protrudes from the one surface of the rotation member, and contacts the other surface of the housing.

3. The lens assembly of claim 1, further comprising:
at least one first yoke mounted to the housing;
at least one coil mounted to one of the housing and the rotation member, between the rotation member and the at least one first yoke; and
at least one magnetic body mounted to the other of the housing and the rotation member, between the rotation member and the at least one first yoke,
wherein the rotation member rotates by an electromagnetic force generated between the at least one coil and the at least one magnetic body.

4. The lens assembly of claim 3, further comprising a second yoke mounted to the rotation member, in correspondence with the at least one first yoke.

5. The lens assembly of claim 3, further comprising:
a position sensor mounted to the housing, the position sensor being configured to detect a rotation position of the rotation member; and
at least one of a gyro sensor or an accelerometer sensor configured to detect a rotational vibration of the rotation member.

6. The lens assembly of claim 1, further comprising:
a first fixing piece extended from the other surface of the housing;
a second fixing piece formed on a sidewall of the rotation member, the second fixing piece being configured to face the first fixing piece when the rotation member is engaged with the other surface of the housing; and
a driving wire having one end fixed to the first fixing piece and another end fixed to the second fixing piece,
wherein the driving wire contains a shape memory alloy material, and the rotation member is configured to rotate by deformation of the driving wire.

7. The lens assembly of claim 1, wherein the image sensor assembly further comprises:
a circuit board mounted on the rotation member;
an image sensor mounted on the circuit board; and
an opening formed in the rotation member, and
wherein the image sensor of the image sensor assembly faces the lens barrel through the opening.

8. The lens assembly of claim 1, further comprising:
a guide member mounted to the housing and forming a first sidewall of the housing; and
a first operation member mounted to the guide member, the first operation member being configured to advance and retreat along the optical axis on the housing.

9. The lens assembly of claim 8, further comprising:
a second operation member mounted to the first operation member, the second operation member being configured to perform a linear reciprocal movement in a first direction perpendicular to the optical axis; and
a third operation member mounted to the second operation member, the third operation member being configured to perform a linear reciprocal movement in a second direction perpendicular to each of the first direction and the optical axis,
wherein the lens barrel is mounted on the third operation member.

10. The lens assembly of claim 9, further comprising one or more balls interposed between the first operation member and the second operation member and between the second operation member and the third operation member, respectively.

11. The lens assembly of claim 1, further comprising a position sensor mounted to the housing, the position sensor being configured to detect a rotation position of the rotation member.

12. An electronic device comprising:
a lens assembly;
an image sensor configured to detect image information based on light incident through the lens assembly; and
at least one processor configured to generate an image based on the image information detected through the image sensor,
wherein the lens assembly comprises:
a lens barrel;
a housing configured to accommodate the lens barrel on one surface of the housing; and
an image sensor assembly mounted to the other surface of the housing, the image sensor assembly being configured to rotate on a plane perpendicular to an optical axis of the lens barrel,
wherein the image sensor assembly comprises:
a ring-shaped rotation member facing the other surface of the housing; and
a plurality of balls interposed between the rotation member and the other surface of the housing, and
wherein the image sensor is mounted to the rotation member.

13. The electronic device of claim 12,
wherein the image sensor assembly further comprises a plurality of grooves formed on one surface of the rotation member, and
wherein each of the plurality of balls is accommodated in one of the grooves, protruding from the one surface of the rotation member and contacting the other surface of the housing.

14. The electronic device of claim 13,
wherein the lens assembly further comprises:
at least one first yoke mounted to the housing;
at least one coil mounted to one of the housing and the rotation member, between the rotation member and the at least one first yoke; and at least one magnetic body mounted to the other of the housing and the rotation member, between the rotation member and the at least one first yoke, and wherein the rotation member rotates by an electromagnetic force generated between the at least one coil and the at least one magnetic body.

15. The electronic device of claim 14, wherein the lens assembly further comprises a second yoke mounted to the rotation member, in correspondence with the at least one first yoke.

16. The electronic device of claim 14, further comprising:
a position sensor mounted to the housing, the position sensor being configured to detect a rotation position of the rotation member; and
at least one of a gyro sensor or an accelerometer sensor configured to detect a rotational vibration of the rotation member,
wherein the at least one processor is further configured to:
apply an electrical signal to generate the electromagnetic force between the at least one coil and the at least one magnetic body to control the rotation of the rotation member based on the rotation position of the rotation member and the rotational vibration of the rotation member.

17. The electronic device of claim 12,
wherein the lens assembly further comprises:
a first fixing piece extended from the other surface of the housing;
a second fixing piece formed on a sidewall of the rotation member, and the second fixing piece being configured to face the first fixing piece when the rotation member is engaged with the other surface of the housing; and
a driving wire having one end fixed to the first fixing piece and the other end fixed to the second fixing piece, and
wherein the driving wire contains a shape memory alloy material, and the rotation member is configured to rotate by deformation of the driving wire.

18. The electronic device of claim 12,
wherein the image sensor assembly further comprises:
a circuit board mounted on the rotation member; and
an opening formed in the rotation member, and
wherein the image sensor faces the lens barrel through the opening.

19. The electronic device of claim 12, wherein the lens assembly further comprises:
a guide member mounted to the housing and forming a first sidewall of the housing; and
a first operation member mounted to the guide member, the first operation member being configured to advance and retreat along the optical axis on the housing.

20. The electronic device of claim 19,
wherein the lens assembly further comprises:
a second operation member mounted to the first operation member, the second operation member being configured to perform a linear reciprocal movement in a first direction perpendicular to the optical axis; and
a third operation member mounted to the second operation member, the third operation member being configured to perform a linear reciprocal movement in a second direction perpendicular to each of the first direction and the optical axis, and
wherein the lens barrel is mounted on the third operation member.

21. The electronic device of claim 20, wherein the lens assembly further comprises one or more balls interposed between the first operation member and the second operation member and between the second operation member and the third operation member.

22. The electronic device of claim 12, wherein the lens assembly further comprises a position sensor mounted to the housing, the position sensor being configured to detect a rotation position of the rotation member.

* * * * *